United States Patent
Malz, Jr. et al.

(10) Patent No.: US 6,706,217 B2
(45) Date of Patent: Mar. 16, 2004

(54) LIQUID ANTIOZONANTS AND RUBBER COMPOSITIONS CONTAINING SAME

(75) Inventors: Russell E. Malz, Jr., Naugatuck, CT (US); Michael P. Reynolds, Naugatuck, CT (US); Richard A. Gencarelli, Cheshire, CT (US)

(73) Assignee: Uniroyal Chemical Company, Inc., Middlebury, CT (US)

( * ) Notice: Subject to any disclaimer, the term of this patent is extended or adjusted under 35 U.S.C. 154(b) by 60 days.

(21) Appl. No.: 10/054,275

(22) Filed: Oct. 22, 2001

(65) Prior Publication Data

US 2002/0061946 A1 May 23, 2002

Related U.S. Application Data

(62) Division of application No. 09/552,098, filed on Apr. 19, 2000.

(51) Int. Cl.[7] ............... C09K 15/20; C07C 211/09; C07C 209/00; C08K 5/18; C08J 3/20
(52) U.S. Cl. ............... 252/403; 252/401; 564/305; 564/402; 564/415; 564/434; 524/254; 524/255; 524/541
(58) Field of Search ............... 252/401, 403, 252/402; 564/305; 523/77; 524/254, 255, 541, 402, 415, 408, 420, 434

(56) References Cited

U.S. PATENT DOCUMENTS

| | | | | |
|---|---|---|---|---|
| 1,906,935 A | * | 5/1933 | Horst | |
| 2,002,642 A | * | 5/1935 | Meuser et al. | |
| 2,562,802 A | * | 6/1951 | Mankowich | |
| 3,414,616 A | * | 12/1968 | Summers | |
| 3,542,691 A | | 11/1970 | Budd et al. | 252/401 |
| 3,839,275 A | * | 10/1974 | Wilder | |
| 4,269,763 A | * | 5/1981 | Miller | |
| 4,304,939 A | * | 12/1981 | Symon | 564/396 |
| 4,463,191 A | * | 7/1984 | D'Sidocky et al. | 564/398 |
| 4,563,188 A | * | 1/1986 | Bugaut et al. | 8/410 |
| 4,764,547 A | * | 8/1988 | Hatanaka et al. | 523/215 |
| 4,900,868 A | * | 2/1990 | Merten et al. | 564/398 |
| 5,252,737 A | * | 10/1993 | Stern et al. | 544/392 |
| 5,420,354 A | | 5/1995 | Malz et al. | 564/423 |
| 5,574,187 A | | 11/1996 | Malz et al. | 564/402 |
| 5,840,982 A | | 11/1998 | Reynolds et al. | 564/423 |
| 6,182,728 B1 | * | 2/2001 | Williams et al. | 152/517 |

FOREIGN PATENT DOCUMENTS

EP  0 0 84527  1/1983

OTHER PUBLICATIONS

Ruprecht et al., "Roll Covering by Rotational Casting with Fast–Reacting PUR Systems", Polyurethanes World Congress 1991 (Sep. 24–26, 1991) pp. 478–481.

* cited by examiner

Primary Examiner—Joseph D. Anthony
(74) Attorney, Agent, or Firm—Daniel Reitenbach

(57) ABSTRACT

Liquid antiozonant mixtures obtained from the process comprising simultaneously reacting at least one unsubstituted and/or substituted paraphenylenediamine compound with a carbonyl compound mixture comprising acetone and at least one other carbonyl compound selected from the group consisting of ketones containing from 4 to about 12 carbon atoms, aldehydes containing from 1 to about 12 carbon atoms and mixtures thereof in the presence of a reductive alkylation catalyst is provided. Rubber compositions containing the liquid antiozonant mixtures is also provided.

13 Claims, No Drawings

LIQUID ANTIOZONANTS AND RUBBER COMPOSITIONS CONTAINING SAME

CROSS REFERENCE TO RELATED APPLICATIONS

This application is a divisional application of co-pending U.S. application Ser. No. 09/552,098, filed Apr. 19, 2000.

BACKGROUND OF THE INVENTION

This invention relates to a liquid antiozonant made up of a reaction product of unsubstituted and/or substituted paraphenylenediamine compounds and a carbonyl compound mixture formed from acetone and at least one other carbonyl compound and to rubber compositions containing same.

It is well known that ozone causes surface cracking of conventional highly unsaturated rubber vulcanizates when the rubber is placed under strain in an ozone environment. The function of ozone is purely a surface phenomenon. The most severe deterioration occurs when a small number of cracks are formed which grow rapidly into deep, disruptive fissures. The function of an antiozonant depends on its migration to the surface of the rubber article where protection against the ozone attack is needed.

Chemical antiozonants have therefore been developed to retard the formation of ozone cracks occurring under static and dynamic conditions. Widely used antiozonants in protecting vulcanized rubber from ozone attack are N,N'-disubstituted paraphenyldiamines. Examples of these antiozonants in common use include N-phenyl-N'-(1,3-dimethylbutyl)-p-phenylenediamine; N-phenyl-N'-isopropyl-p-phenylenediamine; N-phenyl-N'-(1,4-dimethylpentyl)-p-phenylenediamine; N-phenyl-N'-(1-methylheptyl)-p-phenylenediamine; N-phenyl-N'-cyclohexyl-p-phenylenediamine; mixed diaryl-p-phenylenediamines; N,N'-diphenyl-p-phenylenediamine; N,N'-di-beta-naphthyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; and N-phenyl-N'-p-toluenesulfonyl-p-phenylenediamine.

Blends of two or more paraphenylenediamine materials have been used in rubber and provide certain advantages over individual paraphenylene materials. For example, it has been found advantageous to blend two or more paraphenylenediamines for the purpose of obtaining a product which can be handled as a liquid under normal temperatures. Blends are also used where the particular properties of two or more paraphenylenediamines are desired in a single product.

In general, blends have typically been produced by physically mixing two or more separately prepared paraphenylenediamine materials but this process requires additional storage and mixing equipment. Another process includes, for example, U.S. Pat. No. 3,542,691 which discloses a one-step process for preparing a liquid N-alkyl-N'-phenyl-paraphenylenediamine system by reductively alkylating at least one nitrogen-containing compound selected form the group consisting of p-nitrodiphenylamine, p-aminodiphenylamine and p-nitrosodiphenylamine by reacting the nitrogen containing compound with a mixture of 4-methyl-2-peritanone and 5-methyl-2-hexanone in the presence of hydrogen and a reductive alkylation catalyst.

Yet another example is European Patent Application No. 084,527 which discloses a process for preparing a mixture of two or more different N,N'-disubstituted paraphenylenediamines by the reductive alkylation of a nitrogen-containing compound selected from 4-nitrodiphenylamine, 4-aminodiphenylarnine, paranitroaniline and phenylenediamine with two or more ketones wherein the ketones are charged sequentially and each ketone is reacted essentially to completion before charging the next.

SUMMARY OF THE INVENTION

In accordance with the present invention, a liquid antiozonant mixture is provided which is obtained from the process comprising simultaneously reacting at least one unsubstituted and/or substituted paraphenylenediamine compound of the general formula

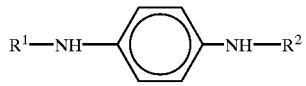

wherein $R^1$ and $R^2$ are the same or different and are hydrogen, a branched or straight chain alkyl, alkenyl, alkoxyl, aralkyl, alkaryl, hydroxyalkyl or heterocyclic; with a carbonyl compound mixture comprising acetone and at least one other carbonyl compound selected from the group consisting of ketones containing from 4 to about 12 carbon atoms, aldehydes containing from 1 to about 12 carbon atoms and mixtures thereof in the presence of a reductive alkylation catalyst.

Additionally, rubber compositions containing the foregoing liquid antiozonant mixtures are also provided herein. The rubber compositions can be, for example, tires, motor mounts, rubber brushings, windshield wiper blades, etc.

The liquid antioxonant mixtures obtained from the process described herein advantageously provides unsubstituted and/or substituted paraphenylenediamines, which have been reductively alkylated with a arbonyl compound mixture formed from acetone and at least one other carbonyl compound, e.g., ketones and/or aldehydes, possessing different migratory rates for use in rubber compositions, e.g., tire compositions, thereby providing greater protection against ozone attack and, therefore, extending the life expectancy of the rubber composition. Additionally, by employing acetone with at least one other carbonyl compound in the process described herein, the antiozonant mixture possesses greater reduced temperature stability in maintaining its liquid state.

DESCRIPTION OF THE PREFERRED EMBODIMENTS

The liquid antiozonant mixtures of this invention are obtained by simultaneously reacting at least one unsubstituted and/or substituted paraphenylenediamine compound of the general formula

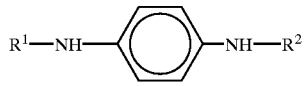

wherein $R^1$ and $R^2$ are the same or different and are hydrogen, a branched or straight chain alkyl from 1 to about 24 carbon atoms; alkenyl; alkoxyl; aralkyl; alkaryl; hydroxyalkyl or heterocyclic, e.g., pyrrolidine, piperidine, piperazine, morpholine, 2-(2-aminoethyl)-1-methylpyrrolidine, 4-(2-aminoethyl)morpholine, 1-(2-aminoethyl)pyrrolidine, 1-(2-aminoethyl)piperidine, 1-(2-aminoethyl)piperazine, etc.; with a carbonyl compound mixture formed from acetone and at least one other carbonyl compound selected from the group consisting of ketones containing from 4 to about 12 carbon atoms, aldehydes containing from 1 to about 12 carbon atoms and mixtures thereof in the presence of a reductive alkylation catalyst.

Many of the starting unsubstituted and/or substituted paraphenylene-diamines and their preparation are well known. See, e.g., U.S. Pat. Nos. 5,420,354; 5,574,187 and 5,840,982, the contents of which are incorporated by reference herein. Examples of suitable unsubstituted and substituted paraphenylenediamines for use herein include paraphenylenediamine, paraaminodiphenylamine, N,N'-bis(1-methylheptyl)-p-phenylenediamine; N,N'-bis(1-ethyl-3-methylpentyl)-p-phenylenediamine, N,N'-bis(1,4-dimethylpentyl)-p-phenylenediamine, N,N-di-beta-naphthyl-p-phenylenediamine, N-o-tolyl-N'phenyl-p-phenylenediamine, N,N-di-p-tolyl-p-phenylenediamine, N-1,3-dimethylbutyl-N'-phenyl-p-phenylenediamine, N-1,4-dimethylpentyl-N'-phenyl-p-phenylenediamine, N-isopropyl-N'-phenyl-p-phenylenediamine, N-1-methylpropyl-N'-phenyl-p-phenylenediamine, N-cyclohexyl-N'phenyl-p-phenylenediamine, N,N'-bis-(1-ethyl-3-methylpentyl)-p-phenylenediamine, N,N'-bis-(1,4-dimethylpentyl)-p-phenylenediamine, N,N'-bis-(1-methylpropyl)-p-phenylenediamine, N-phenyl-N'-(1,3-dimethylbutyl)-p-phenylenediamine; N-phenyl-N'-isopropyl-p-phenylenediamine; N-phenyl-N'-(1-methylheptyl)-p-phenylenediamine; N-phenyl-N'-cyclohexyl-p-phenylenediamine; mixed diaryl-p-phenylenediamines; N,N'-bis(1-methylheptyl)-p-phenylenediamine; N-phenyl-N'-p-toluenesulfonyl-p-phenylenediamine; N-phenyl-N'-alkyl-p-phenylenediamine; and the like and combinations thereof. Preferred starting paraphenylenediamine compounds for use herein are paraphenylenediamine and paraaminodiphenylamine.

Suitable ketones containing from 4 to about 12 carbon atoms to include with acetone in forming the carbonyl compound mixture thereof to react with the foregoing paraphenylenediamine compounds include methyl ethyl ketone, diethyl ketone, methyl propyl ketone, methyl isopropyl ketone, ethyl propyl ketone, ethyl isopropyl ketone, dipropyl ketone, diisopropyl ketone, methyl butyl ketone, methyl isobutyl ketone, methyl sec butyl ketone, methyl tert-butyl ketone, ethyl butyl ketone, ethyl isobutyl ketone, ethyl sec-butyl ketone, ethyl tert-butyl ketone, propyl butyl ketone, isopropyl butyl ketone, propyl isobutyl ketone, propyl sec-butyl ketone, propyl tert butyl ketone, isopropyl isobutyl ketone, isopropyl sec-butyl ketone, isopropyl tert-butyl ketone, dibutyl ketone, diisobutyl ketone, di-sec-butyl ketone, di-tert-butyl ketone, butyl isobutyl ketone, butyl sec-butyl ketone, butyl tert-butyl ketone, isobutyl sec-butyl ketone, isobutyl tert-butyl ketone, sec-butyl tert-butyl ketone, 5-heptanone, 5-methyl-2-hexanone (methyl isoamyl ketone), 4-methyl-2-hexanone, 3-methyl-2-hexanone, 3,4-dimethyl-2-pentanone, 3,3-dimethyl-2-pentanone, 4,4-dimethyl-2-pentanone, 3-octanone, 4-methyl-3-heptanone, 5-methyl-3-heptanone, 6-methyl-3-heptanone, 4,4-dimethyl-3-hexanone, 4,5-dimethyl-3-hexanone, 5,5-dimethyl-3-hexanone, 4-nonanone, 5-methyl-4-octanone, 6-methyl-4-octanone, 7-methyl-4-octanone, 5,5-dimethyl-4-neptanone, 5,6-dimethyl-4-heptanone, 6,6-dimethyl-4-heptanone, 2-undecanone, cyclopropanone, cyclobutanone, cyclopentanone, cyclohexanone, cycloheptanone, cyclooctanone, cyclononanone, cyclodecanone, cycloundecanone, cyclododecanone and the like and combinations thereof. It is particularly desirable to employ at least two other ketones and more preferably at least four other ketones in addition to acetone. However, it will ordinarily depend on the particular rubber composition formed, which is described hereinbelow, in adding additional ketones to the foregoing carbonyl compound mixture.

Suitable aldehydes containing from 1 to about 12 carbon atoms for use herein include formaldehyde, acetaldehyde, propionaldehyde, butyraldehyde, 2-methylpropionaldehyde, valeraldehyde, 2-methyl-butanal, caproaldehyde, hexaldehyde, heptaldehyde, octaldehyde, nonaldehyde, decaldehyde, undecaldehyde, dodecaldehyde, benzaldehyde, phenylacetaldehyde, and the like and combinations thereof. As with the foregoing ketones, the number of aldehydes employed in the carbonyl compound mixture will ordinarily depend on the particular rubber composition formed herein.

The molar ratio of acetone to other carbonal compound (s), i.e., ketones and/or aldehydes, will ordinarily range from about 1:99 to about 75:25, preferably from about 5:95 to about 50:50 and more preferably from about 10:90 to about 25:75.

The liquid antiozonant mixtures of this invention are obtained by simultaneously reacting the unsubstituted and/or substituted paraphenylenediamines and carbonyl compound mixture in the presence of a suitable reductive alkylation catalyst such as Group VIII metals, e.g., platinum, palladium, rhodium, ruthenium, nickel, cobalt, etc., and their sulfides, e.g., platinum sulfide, and the like. The reaction is advantageously conducted in a suitable reaction vessel, e.g., an autoclave, by heating the mixture to a reaction temperature ranging from about room temperature to about 300° C. and preferably from about 60° C. to about 200° C. and hydrogen under pressure from about 50 psig to about 2000 psig is then introduced to the reaction vessel. The time period for the carbonyl compound mixture to react with the foregoing paraphenylenediamine compounds will depend on the particular ketones and aldehydes utilized in the carbonyl compound mixture. The pressure on the reactor vessel is then released and the product antiozonant mixture is recovered employing techniques known in the art, e.g., filtration or distillation.

The molar ratio of the carbonyl compound mixture to the unsubstituted and/or substituted paraphenylenediamine compounds in the reaction mixture will ordinarily range from about 1:1 to about 2:1 and most preferably from about 1.2:1.

The antiozonant mixtures of this invention can be advantageously utilized in rubber compositions as antiozonants to protect, for example, highly unsaturated rubbers such as natural or synthetic elastomers. Representative of the highly unsaturated polymers that can be employed in the practice of this invention are diene elastomers. Such elastomers will ordinarily possess an iodine number of between about 100 to about 250, although highly unsaturated rubbers having a higher or a lower (e.g., of 50–100) iodine number can also be employed. Illustrative of the diene elastomers that can be utilized are polymers based on conjugated dienes such as, for example, 1,3-butadiene; 2-methyl-1,3-butadiene; 1,3-pentadiene; 2,3-dimethyl-1,3-butadiene; and the like, as well as copolymers of such conjugated dienes with monomers such as, for example, styrene, alpha-methylstyrene, acetylene, e.g., vinyl acetylene, acrylonitrile, methacrylonitrile, methyl acrylate, ethyl acrylate, methyl methacrylate, ethyl methacrylate, vinyl acetate, and the like. Preferred highly unsaturated rubbers include natural rubber, cis-polyisoprene, polybutadiene, poly(styrene-butadiene), polychloroprene, and poly (acrylonitrile-butadiene). Moreover, mixtures of two or more highly unsaturated rubbers with elastomers having lesser unsaturation such as EPDM, EPR, butyl or halogenated butyl rubbers are also within the contemplation of the invention.

The antiozonant mixtures of the present invention can be used in a wide variety of proportions in the above polymers. Generally, the level of antiozonant mixture that may be added to rubber compositions can range from about 2 to about 6 parts per hundred parts of polymer. Preferably, the amount of the antiozonant mixture that is used ranges from about 3 to about 4 parts per hundred polymer.

The rubber compositions containing the antiozonant mixtures are particularly useful when formed as, for example, tires, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, windshield wiper blades and the like. Preferably, the rubber compositions containing the antiozonant mixture of this invention are advantageously used in a tire as a component of any or all of the thermosetting rubber-containing portions of the tire. These include the tread, sidewall, and carcass portions of, for example, a car tire, truck tire, passenger tire, off-road vehicle tire, high speed tire and the like that also contain many different reinforcing layers therein. These components typically contain more than one thermosetting rubber polymer in a blend that must be protected from ozone degradation as well as oxidative attack. The amount of antiozonant mixture and the number of different carbonyl compounds employed with acetone therein will depend on the particular type of tire being formed. For example, where the tire is an off-road tire, this tire is typically in the static condition and therefore would be in need of less protection against ozone attack. Therefore, the antiozonant mixture will not have to contain a high number of resulting products formed therein, i.e., employing a high number of additional carbonyl compounds, i.e., ketones and/or aldehydes, with acetone, having different migratory rates. However, when using high-speed tires, the antiozonant mixture will contain a high number of different resulting products formed therein possessing different migratory rates since this tire is highly susceptible to ozone attack.

The highly unsaturated polymers to be protected can be formulated in any conventional manner. In addition to the antiozonant mixtures of this invention, other common ingredients can be added to the rubber compositions of this invention. Suitable common ingredients for use herein include vulcanizing agents, accelerators, activators, retarders, antioxidants, plasticizing oils and softeners, fillers, reinforcing pigments, carbon black, waxes, tackifier resins, and the like.

The following examples are illustrated of the antiozonant mixture of this invention.

EXAMPLE 1

Into a 1-liter autoclave were added 184 grams paraphenylenediamine (1.0 mole), 5.8 grams acetone (0.1 moles), 7.2 grams methyl ethyl ketone (0.1 moles), 8.4 grams cyclopentanone (0.1 moles), 9.8 grams cyclohexanone (0.1 moles), 28.5 grams methylisoamyl ketone (0.25 moles) and 60.0 grams methylisobutyl ketone (0.6 moles) together with 7.4 grams 3% platinum sulfide/carbon waterwet (3.3 grams dry weight) catalyst. The mixture was subjected to 380–800 psig pressure of hydrogen at 130° C. for one hour after gas absorption ceases.

EXAMPLE 2

Into a 1-liter autoclave were added 184 grams paraphenylenediamine (1.0 mole), 5.8 grams acetone (0.1 moles), 7.2 grams methyl ethyl ketone (0.1 moles), 8.4 grams cyclopentanone (0.1 moles), 9.8 grams cyclohexanone (0.1 moles), 17.0 grams 2-undecanone (0.1 moles), 17.1 grams methylisoamyl ketone (0.15 moles) and 60.0 grams methylisobutyl ketone (0.6 moles) together with 7.4 grams 3% platinum sulfide/carbon waterwet (3.3 grams dry weight) catalyst. The mixture was subjected to 380–800 psig pressure of hydrogen at 130° C. for one hour after gas absorption ceases.

What is claimed:

1. A rubber composition comprising (a) a rubber component; and, (b) a liquid antiozonant mixture obtained from the process comprising simultaneously reacting at least one unsubstituted and/or substituted paraphenylene-diamine compound of the general formula

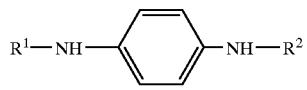

wherein $R^1$ and $R^2$ are the same or different and are hydrogen, a branched or straight chain alkyl, alkenyl, alkoxyl, aralkyl, alkaryl, phenyl, hydroxyalkyl or heterocyclic; with a carbonyl compound mixture comprising acetone and at least one other carbonyl compound selected from the group consisting of ketones containing from 4 to about 12 carbon atoms, aldehydes containing from 1 to about 12 carbon atoms and mixtures thereof in the presence of a reductive alkylation catalyst.

2. The rubber composition of claim 1 wherein the rubber component is selected from the group consisting of natural rubber, homopolymers of conjugated diolefins, copolymers of conjugated diolefins and ethylenically unsaturated monomers and mixtures thereof.

3. The rubber composition of claim 1 wherein the paraphenylenediamine compound is selected from the group consisting of paraphenylenediamine, paraaminodiphenylamine, N,N'-bis(1-methylheptyl)-p-phenylenediamine; N,N'-bis(1-ethyl-3-methylpentyl)-p-phenylenediamine, N,N'-bis(1,4-dimethylpentyl)-p-phenylenediamine, N,N-di-beta-naphthyl-p-phenylenediamine, N-o-tolyl-N'phenyl-p-phenylenediamine, N,N-di-p-tolyl-p-phenylenediamine, N-1,3-dimethylbutyl-N'-phenyl-p-phenylenediamine, N-1,4-dimethylpentyl-N'-phenyl-p-phenylenediamine, N-isopropyl-N'-phenyl-p-phenylenediamine, N-1-methylpropyl-N'-phenyl-p-phenylenediamine, N-cyclohexyl-N'phenyl-p-phenylenediamine, N,N'-bis-(1-ethyl-3-methylpentyl)-p-phenylenediamine, N,N'-bis-(1,4-dimethylpentyl)-p-phenylenediamine, N,N'-bis-(1-methylpropyl)-p-phenylenediamine, N-phenyl-N'-(1,3-dimethylbutyl)-p-phenylenediamine; N-phenyl-N'-isopropyl-p-phenylenediamine; N-phenyl-N'-(1-methylheptyl)-p-phenylenediamine; N-phenyl-N'-cyclohexyl-p-phenylenediamine; mixed diaryl-p-phenylenediamines; N,N'-bis(1-methylheptyl)-p-phenylenediamine; N-phenyl-N'-p-toluenesulfonyl-p-phenylenediamine; N-phenyl-N'-alkyl-p-phenylenediamine and combination thereof.

4. The rubber composition of claim 1 wherein the ketone present in the carbonyl compound mixture is selected from the group consisting of methyl ethyl ketone, diethyl ketone, methyl propyl ketone, methyl isopropyl ketone, ethyl propyl ketone, ethyl isopropyl ketone, dipropyl ketone, diisopropyl ketone, methyl butyl ketone, methyl isobutyl ketone, methyl sec butyl ketone, methyl tert-butyl ketone, ethyl butyl ketone, ethyl isobutyl ketone, ethyl sec-butyl ketone, ethyl tert-butyl ketone, propyl butyl ketone, isopropyl butyl ketone, propyl isobutyl ketone, propyl sec-butyl ketone, propyl tert butyl ketone, isopropyl isobutyl ketone, isopropyl sec-butyl ketone, isopropyl tert-butyl ketone, dibutyl ketone, diisobutyl ketone, di-sec-butyl ketone, di-tert-butyl ketone, butyl isobutyl ketone, butyl sec-butyl ketone, butyl tert-butyl ketone, isobutyl sec-butyl ketone, isobutyl tert-butyl ketone, sec-butyl tert-butyl ketone, 5-heptanone, 5-methyl-2-hexanone, 4-methyl-2-hexanone, 3-methyl-2-hexanone, 3,4-dimethyl-2-pentanone, 3,3-dimethyl-2-pentanone, 4,4-dimethyl-2-pentanone, 3-octanone, 4-methyl-3-heptanone, 5-methyl-3-heptanone, 6-methyl-3-heptanone, 4,4-dimethyl-3-hexanone, 4,5-dimethyl-3-hexanone, 5,5-dimethyl-3-hexanone, 4-nonanone, 5-methyl-4-octanone, 6-methyl-4-octanone, 7-methyl-4-octanone, 5,5-dimethyl-4-neptanone, 5,6-dimethyl-4-heptanone, 6,6-dimethyl-4-heptanone, 2-undecanone, cyclopropanone, cyclobutanone, cyclopentanone, cyclohexanone, cycloheptanone, cyclooctanone, cyclononanone, cyclodecanone, cycloundecanone, cyclododecanone and combinations thereof.

5. The rubber composition of claim 1 wherein the aldehyde present in the carbonyl compound mixture is selected from the group consisting of formaldehyde acetaldehyde, propionaldehyde, butyraldehyde, 2-methylpropionaldehyde, valeraldehyde, 2-methyl-butanal, caproaldehyde, hexaldehyde, heptaldehyde, octaldehyde, nonaldehyde, decaldehyde, undecaldehyde, dodecaldehyde, benzaldehyde, phenylacetaldehyde and combinations thereof.

6. The rubber composition of claim 1 wherein the molar ratio of acetone to other carbonyl compound present in the carbonyl compound mixture of the antiozonant mixture is from about 1:99 to about 75:25.

7. The rubber composition of claim 1 wherein the molar ratio of acetone to other carbonyl compound present in the carbonyl compound mixture of the antiozonant mixture is from about 10:90 to about 50:50.

8. The rubber composition of claim 1 wherein the molar ratio of the carbonyl compound mixture to the paraphenylenediamine compound present in the antiozonant mixture is from about 1.2:1.

9. The rubber composition of claim 1 wherein the reductive alkylation catalyst is a Group VIII metal.

10. The rubber composition of claim 9 wherein the Group VIII metal is selected from the group consisting of platinum, palladium, rhodium, ruthenium, nickel, cobalt and their sulfides.

11. The rubber composition of claim 1 wherein the reductive alkylation catalyst is platinum sulfide.

12. The rubber composition of claim 1 wherein the antiozonant mixture is present in an amount ranging from about 2 to about 6 parts per hundred parts of the polymer of the rubber component.

13. The rubber composition of claim 1 which is a tire, motor mount, rubber brushing, power belt, printing roll, rubber shoe heel and sole, rubber floor tile, caster wheel, elastomer seal and gasket, conveyor belt cover, wringer, hard rubber battery case, automobile floor mat, truck mud flap, ball mill liner or windshield wiper blade.

* * * * *